United States Patent [19]

Schaeffer et al.

[11] Patent Number: 4,938,903
[45] Date of Patent: Jul. 3, 1990

[54] HIGHLY INTENSIVE COOLING PROCESS AND APPARATUS FOR THE PRODUCTION OF BIAXIALLY ORIENTED FILMS OF HIGH- AND MEDIUM-MOLECULAR-WEIGHT THERMOPLASTICS

[75] Inventors: Gerard Schaeffer; Georg Trunk, both of Worms, Fed. Rep. of Germany

[73] Assignee: Paul Kiefel GmbH, Worms, Fed. Rep. of Germany

[21] Appl. No.: 254,871

[22] Filed: Oct. 7, 1988

[30] Foreign Application Priority Data

May 6, 1988 [DE] Fed. Rep. of Germany ....... 3815415

[51] Int. Cl.$^5$ ........................................... B29C 47/90
[52] U.S. Cl. .................................... 264/565; 264/566; 264/569; 425/72.1; 425/326.1; 425/192 R
[58] Field of Search ............................... 264/565–569, 264/564; 425/72.1, 326.1, 66, 192 R

[56] References Cited

U.S. PATENT DOCUMENTS

| | | | |
|---|---|---|---|
| 4,019,843 | 4/1977 | Zimmermann | 425/72 R |
| 4,189,288 | 2/1980 | Halter | 264/565 |
| 4,251,199 | 2/1981 | Imaizumi et al. | 264/565 |
| 4,606,879 | 8/1986 | Cerisano | 425/72.1 |
| 4,624,823 | 11/1986 | Audureau et al. | 425/72.1 |
| 4,626,397 | 12/1986 | Bose | 425/72.1 |
| 4,632,801 | 12/1986 | Dowd | 425/72.1 |
| 4,643,657 | 2/1987 | Achelpohl et al. | 425/326.1 |
| 4,678,417 | 7/1987 | Upmeier | 425/72 R |

FOREIGN PATENT DOCUMENTS

| | | |
|---|---|---|
| 8968/99 | 8/1986 | Fed. Rep. of Germany . |
| 55-2180 | 1/1980 | Japan . |
| 59-89122 | 5/1984 | Japan .................. 264/564 |
| 61-199925 | 9/1986 | Japan .................. 264/565 |
| 62-149418 | 7/1987 | Japan .................. 264/569 |
| 63-34119 | 2/1988 | Japan .................. 264/565 |
| 63-71331 | 3/1988 | Japan .................. 264/564 |

Primary Examiner—Jeffery Thurlow
Attorney, Agent, or Firm—Staas & Halsey

[57] ABSTRACT

An apparatus for highly intensive cooling of biaxially oriented films from high- and medium-molecular weight thermoplastics using a long neck on a blown film line is described, including: a plastics extruder, a die for forming a tube neck from the extruded plastic, means positioned adjacent the die for externally cooling the tube neck, an expansion zone where the tube neck becomes a bubble, a drag mandrel positioned immediately before the expansion zone for internally contacting, stabilizing and guiding the tube neck, means for continuously providing cool air internally of the tube neck at the expansion zone immediately after the contact, the means including a first tube in communication with a cool air source, and means for continuously removing the cool air that has been heated. A related method includes the steps of: extruding plastic material through a die to form a tube neck, externally cooling the tube neck immediately after emergence of the tube neck from the die, internally contacting, stabilizing, and guiding the tube neck into a bubble, immediately before the expansion zone, by using a drag mandrel, continuously internally cooling the bubble in the expansion zone immediately after the tube neck contacts the drag mandrel, and continuously removing the cool air that has been heated by the thermoplastic.

22 Claims, 9 Drawing Sheets

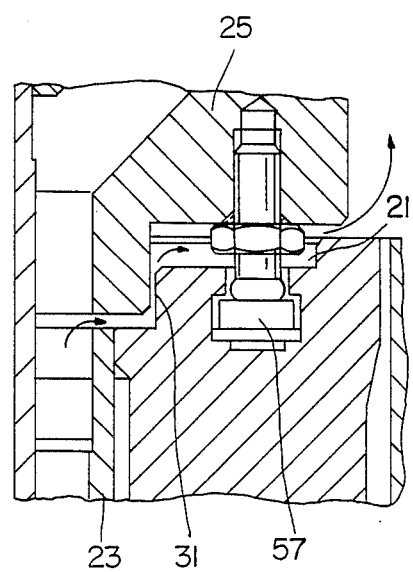
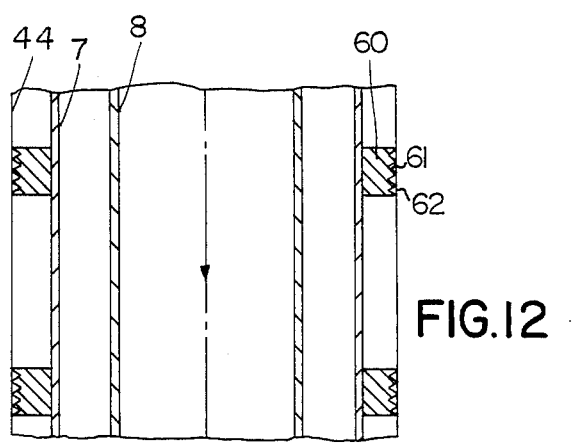
FIG. 10
FIG. 11
FIG. 12

HIGHLY INTENSIVE COOLING PROCESS AND APPARATUS FOR THE PRODUCTION OF BIAXIALLY ORIENTED FILMS OF HIGH- AND MEDIUM-MOLECULAR-WEIGHT THERMOPLASTICS

BACKGROUND OF THE INVENTION

The present invention relates to a highly intensive cooling process and an apparatus for the production of biaxially oriented films from high- and medium-molecular-weight thermoplastics.

Conventional processes for production of biaxially oriented films from medium- and high-molecular-weight HEPE and LDPE polymers and LLDPE mixtures with the so-called "long-neck" procedure are old in the art. The "long-neck procedure" leads to improvement of the mechanical and physical film properties, enhancement of the drawdown of the polymers and achievement of better optical properties with LDPE and LLDPE polymer types.

In what is known as the neck zone of devices of known construction, the tubular film is blown up to the desired diameter. Orientation of the film occurs in the transition zone from the neck to the tubular film.

Furthermore, tests have been carried out in order to achieve higher extrusion outputs with better bubble stabilities, during which the specific die output can be increased only by intensifying the external cooling of the tubular film, i.e., by increasing the air velocity on the external surfaces of the neck and of the transition zone from the neck to the tubular film.

However, the maximum air velocity and thus the maximum cooling effect are very rapidly limited by the stability of the bubble. If the cooling air streams are too large, the instability of the neck will cause considerable upward and downward movements of the bubble, leading to wide fluctuations and wrinkling of the film and ultimately to a break-off of the tubular film. The output limit in the conventional "long neck" process lies between 1.5 and 2.3 kg/cm depending on blow-up ratio, film thickness, type of polymer, and room temperature.

Japanese Pats. No. 55/2180, 53/133,275 and 59/136,224 disclose processes by which the bubble stability was improved and the specific die output increased by the introduction of an internal drag mandrel in the neck zone. However, here the output limit is raised only 20% compared to the conventional process, approximately 1.8 to 2.75 kg/cm.

Further output gains still with good bubble stabilities are achieved by the combination of an external cooling immediately after the melt's emergence from the die, a stabilization with an internal drag mandrel, and a second external cooling on the bubble or in the transition zone.

Such processes are described in Japanese Pat. No. 59/171,620 and in U.S. Pat. No. 4,626,397. These processes, which use a second cooling annulus, are not quite operator-friendly, especially upon starting up the system and when converting the program. The second cooling annulus in the drag mandrel area gives rise to operating problems.

West German Pats. No. 2,262,190, 2,306,831, 2,610,818 and 2,459,785, teach processes which are used for high-speed extrusion of LDPE and LLDPE with the conventional bubble shape or with a short neck. Because of the instability of the bubble, the process with the so-called "long neck", with a height of 6 to 10 times the die diameter, is possible only with restrictions.

An improvement of bubble stability was achieved with U.S. Pat. No. 4,606,879 and with West German Utility Model 85 25 622.6. But here, too, neither system is particularly operator-friendly, because of the second cooling annulus or because of the chambers with iris dampers. Also, the conversions of the production program are sensitive in both systems. A further disadvantage, especially in West German Utility Model 85 25 622.6, is the condensation of the monomers and of the additives to the polymers on the inner surfaces of the chambers and on the iris dampers. Frequent cleaning of the apparatus is necessary in order to ensure the operation of the system.

Therefore, the present invention has as its object the provision of a highly intensive cooling apparatus for the production of biaxially oriented films from high-and medium-molecular-weight thermoplastics, which overcomes the disadvantages described above and features at the same time a combination of an intensive external cooling, which is effective immediately after the melt's emergence from the mold, a stabilizing mandrel positioned in the area of the neck immediately ahead of the expanding area of the bubble, and a highly intensive internal cooling system which is activated immediately after this drag mandrel in the expanding area of the bubble.

This new apparatus results in a significant increase in the specific extrusion output of the die, substantial improvement of the mechanical and physical properties of the film, very close thickness tolerances, and the perfect bubble stability, the exact maintenance of the film width, and the absolute freedom from wrinkles of the lay-flat tubing are always ensured. Furthermore, the present invention is to provide an extremely operator-friendly apparatus, which is particularly flexible and can be used for a very wide range of applications, and which also permits in but a few minutes the startup of the system or a conversion of production.

The invention achieves this object by leading the neck at the expansion zone: in two areas, on a conical contact surface of the drag mandrel and on point contact of air lips, both of which are inside the tube neck, and by activating the internal cooling system immediately after the point contact in the expansion zone of the bubble; or in three areas: on the conical contact surface, the point contact, and on a contact surface of guide rings, on the long-neck and by activating the internal cooling system immediately after the point contact in the expansion area of the bubble, by passing internal cooling air through a coaxial tube extending through the drag mandrel, to the air lips, and sucking the hot air from the internal cooling system centrally through the drag mandrel via another of the coaxial tubes.

Furthermore, an apparatus for carrying out the method of the type mentioned in the introduction is characterized by the fact that it has a first tube mounted on a die, with an internal, second tube disposed therein and inserted into the die and in communication with an exhaust conduit, that it further has a conical drag mandrel disposed around the first external tube, and a terminal exhaust tube provided with air lips, that there is disposed in an end zone of the second tube a centering means that locates the second tube, there being formed in a main manifold at least one cooling channel which leads to a cooling channel that is formed by the first tube and by the second tube mounted on the air main manifold, that the lips of the have at least one cooling channel, that the outside diameters of the air lips are in congruent relationship with the outside diameter of the conical drag mandrel, or that the air lips have a portion that projects beyond the drag mandrel and forms a point contact, that channels that operate for pressure equalization are formed between the die and the main manifold, that there is formed between the drag mandrel and the first tube a gap which is in communication with vent bores disposed in the tube, as well as slots that operate for pressure equalization and are disposed near a centering means between the drag mandrel and the first tube, that a thermal expansion-compensation device in the form of a cup spring is disposed between the air lips and the terminal exhaust tube, that the apparatus is attached with a bayonet lock to a split ring and thus ensures rapid disassembly of the device, that the drag mandrel is covered with an insulating material, preferably of cotton, the drag mandrel is covered with an insulating ceramic coating, that the conical surface of the drag mandrel has a coarse thread or a wave-like profile in order to reduce the contact area, that at least one guide ring that forms a contact surface is disposed on the first tube, that the guide ring is provided with a coarse thread in order to reduce the contact area, and that the drag mandrel has a set screw for vertical adjustment.

BRIEF DESCRIPTION OF THE DRAWINGS

The invention will now be discussed with reference to the accompanying drawings, which illustrate in more detail preferred embodiments of the invention, in which:

FIG. 10 is an enlargement of the detail designated C in FIGS. 4 and 5.

FIG. 11 is an enlargement of the detail designated D in FIG. 9.

FIG. 12 is an enlargement of the detail designated E in FIG. 9.

DETAILED DESCRIPTION OF THE PREFERRED EMBODIMENTS

Figure 1:
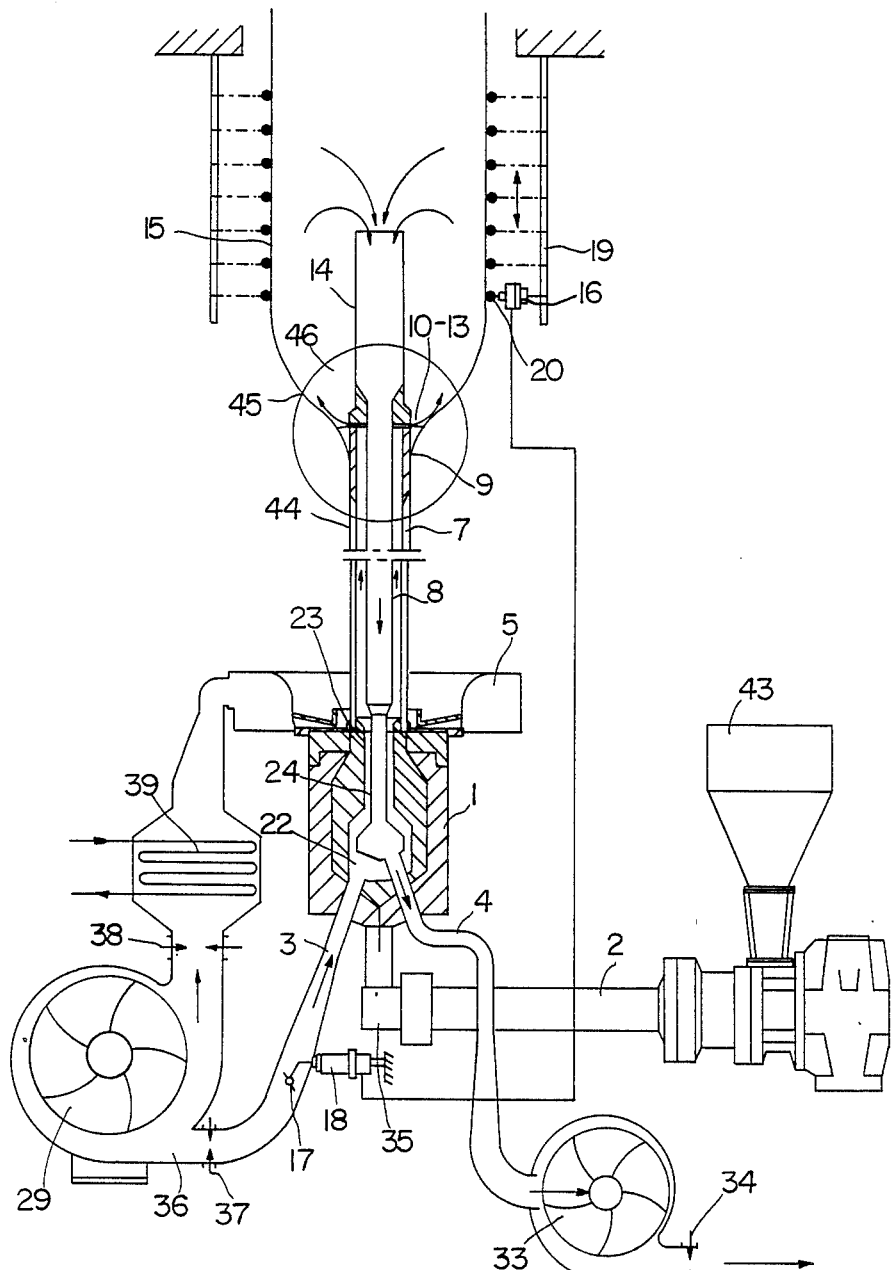
FIG. 1 shows a complete apparatus incorporating the invention.

FIG. 1 shows a complete extrusion system with the device incorporating the invention.

The polyethylene granulate is fed into the hopper 43 and plasticized by the extruder 2, molded under high pressure by the screen pack changer 35 and the die 1 into a tube neck 44, which, after a length of approximately 4 to 10 times the die diameter, expands across an expansion zone 45 to the tubular film 15.

Directly above the die 1 is located a high-intensity external cooling annulus 5 with Venturi inserts 6, and which ensures optimum external cooling of the tube neck 44, the expansion zone 45 and the tubular film 15. The die 1 is prepared for the internal cooling system. The cold-air supply is passed through a tube 3 to a manifold 22, then between coaxial tubes 24 and 23, and 7 and 8 to an internal cooling zone 46. The hot exhaust air is sucked through a central tube 14, tube 8, tube 24, from the manifold 22 and out the tube 4.

The cold-air fan 29 delivers the cooling air through the manifold 36 both to the external cooling annulus 5 and to the internal cooling zone 46. The setting of the air flow rates is effected by the manually-controlled iris dampers 37 and 38.

Additional conditioning of the cooling air is possible by means of a heat exchanger 39, which is attached immediately after the fan 29. The hot-air exhaust fan 33 sucks the hot air from the tubular film 15 through the tubes 14, 8, 24 and 4. The setting of the exhaust-air flow is effected by a manually-controlled iris damper 34.

A vertically adjustable sizing cage 19 ensures the guidance and sizing of the blown tubular film 15. A feeler arm 20, by contacting the tubular film 15, transmits the diameter variations changes of the bubble to an pneumatic sensor 16. The control of the diameter of the blown film tubing 15 is effected by the control valve 17, which, with the air cylinder 18, is controlled by the sensor 16. If the bubble diameter is too large, the control valve 17 automatically throttles the internal air supply and, if the diameter is too small, the control valve 17 opens. This pneumatic control system is accurate to within around 0.1%. Thus, the widths of the lay-flat blown film tubing can be maintained with great precision. For example, the maximum variations observed for a width of 1000 mm are plus or minus 1 mm.

Figure 2:
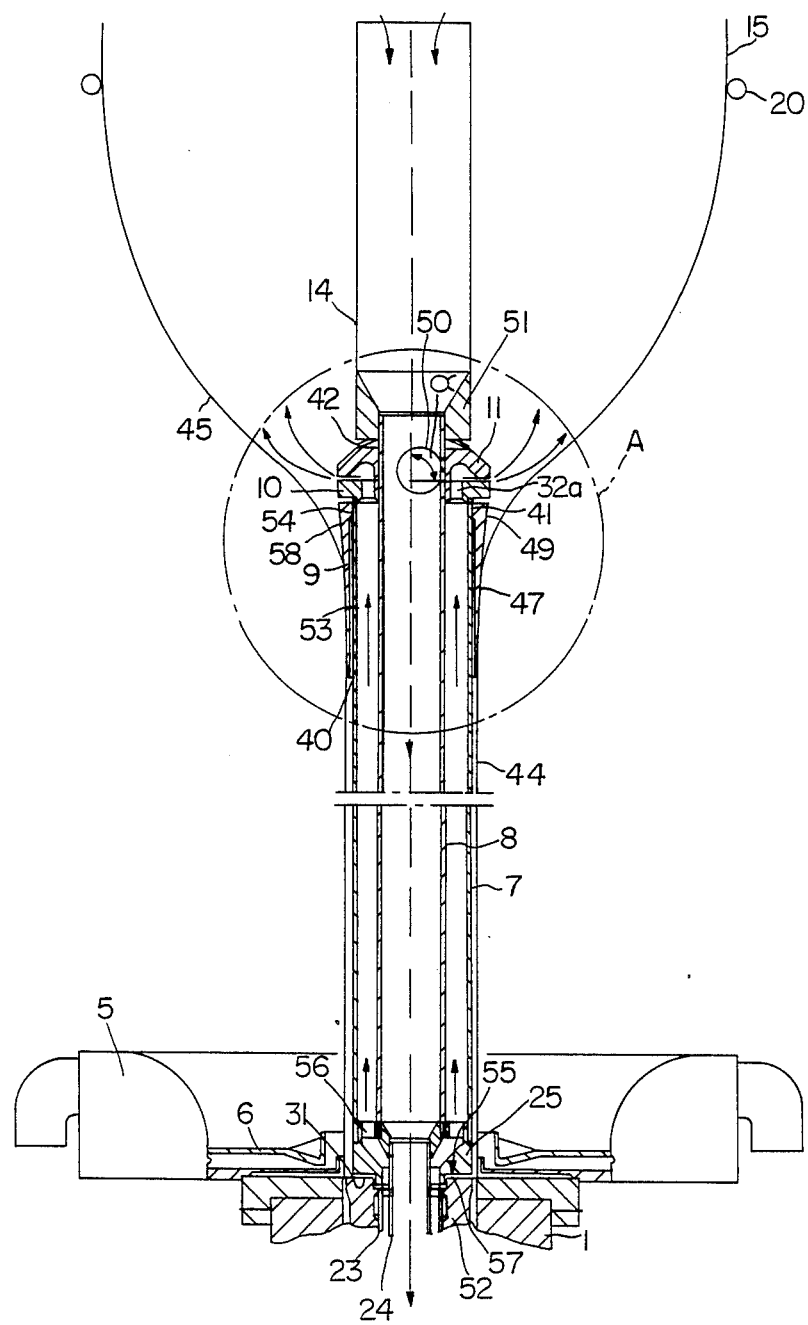
FIG. 2 shows an embodiment of the invention with a conical drag mandrel and small internal air lips.

FIG. 2 shows a practical embodiment of the invention wherein, in addition to a conical drag mandrel 9, internal air lips 10 and 11 are used, the outside diameters of which are congruent with the outside diameter of the internal drag mandrel 9.

The contact between the tube neck 44 and the drag mandrel 9 is made by the conical surface 47, the height of which can be as much as 0.20 times the die diameter, depending on the film production.

Figure 3:
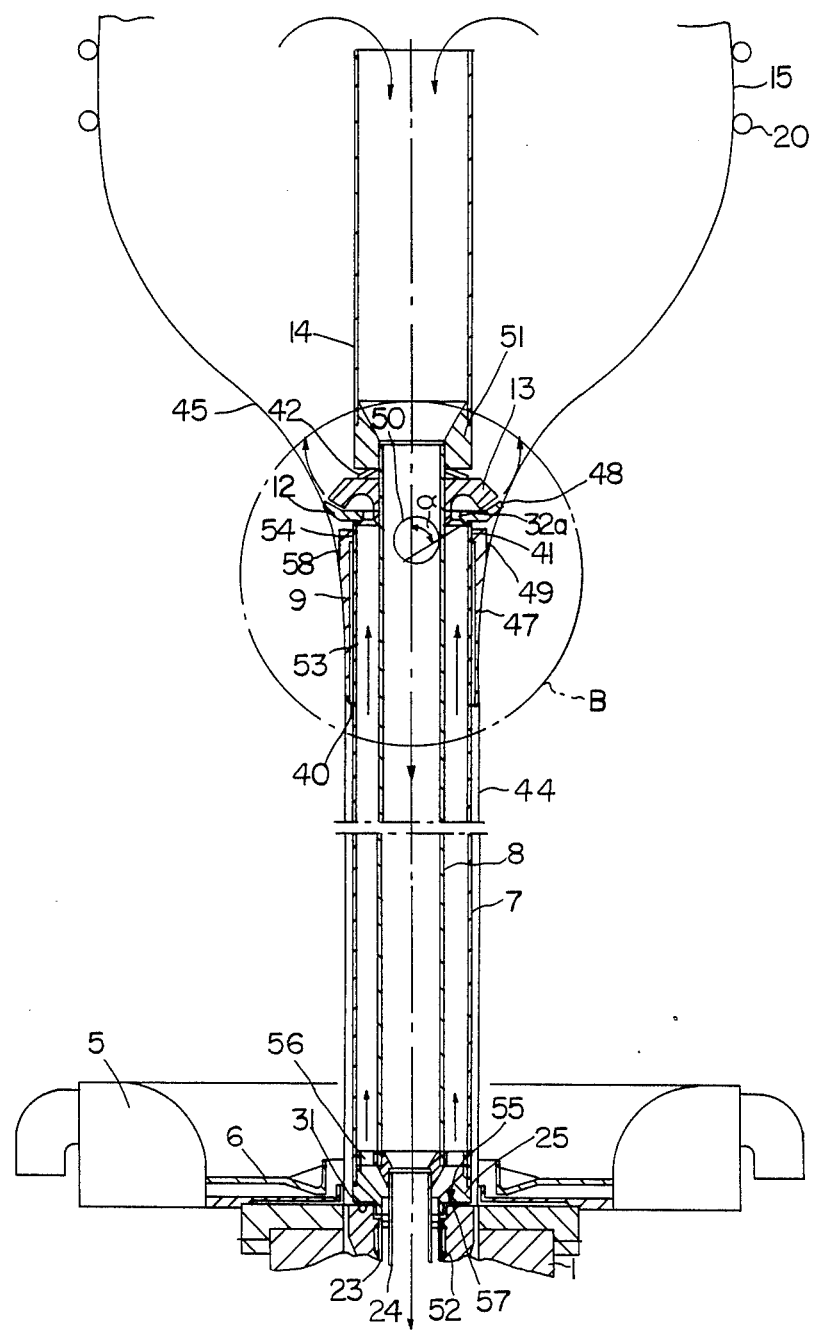
FIG. 3 shows an embodiment of the invention with a conical drag mandrel with larger internal air lips.

FIG. 3 shows an embodiment of the invention with a conical drag mandrel 9, but with much larger internal air lips 12 and 13.

Here, the contact between the tube neck 44 and the parts of the tube neck occurs in two areas:

1. on the conical contact surface 47, and
2. with the point contact 48 of the internal air lip 12.

The advantages of this version are better bubble stability because of the double contact between the tube neck 44 and the expansion zone 45 with the internal drag mandrel 9 and air lip 12, as well as better action of the internal cooling system as a result of the small distance between the internal air lips 12 and 13 and the expansion zone 45 of the tubular film tubing 15.

The tube neck 44, shaped from the die 1 with a height of 4 to 10 times the die diameter, is blown up to the tubular film 15 across the expansion zone 45.

The external cooling occurs by means of the high-intensity cooling annulus 5 with Venturi inserts 6, directly after the melt's emergence from the die 1 along the entire height of the tube neck 44, the expansion zone 45 and to some extent even along the tubular film 15 as well.

The internal cooling is supplied through the die 1 between the tubes 24 and 2 and, between the tubes 7, 8, through the conical drag mandrel 9 to the internal air lips 10 and 11 or 12 and 13.

The hot air is exhausted centrally via the tubes 14 and 24, through the die 1. As shown in FIGS. 2 and 3, the conical drag mandrel 9 is seated on the external tube 7, centrally in the tube neck 44, at the expansion zone 45 in which the tube neck 44 expands into the blown tubular film 15.

Due to the highly turbulent rate of the air emerging from the air lips 10 and 11 or 12 and 13, a very good coefficient of heat transfer to the inside of the expansion zone 45 is ensured, thus guaranteeing a highly intensive internal cooling. In the embodiment shown in FIG. 3, even better cooling is achieved with direct contact between the expanding tube neck 44 and the lower air lip 12, due to the even shorter distance between the air lips 12 and 13 and the tube neck 44 becoming a bubble. As a result, the Reynolds number of the air flow in this zone is even greater, and thus the heat transfer is also more intensive. For the two versions illustrated in FIGS. 2 and 3, the internal cooling system requires less cooling air than in a conventional internal cooling system in order to achieve the same internal cooling effect. Put differently, given the same internal air flow rate, the device embodying the invention, as shown in FIGS. 2 and 3, is more efficient than the systems of known construction.

As illustrated in FIGS. 2 and 3, the drag mandrel 9 is vertically adjustable. The drag mandrel 9 is attached by means of the set screw 49. This vertical adjustment is particularly important in order to be able to set different tube neck 44 heights.

In the embodiment depicted in FIG. 3, the setting of the neck height can be effected only by replacing the tubes 8 and 7. A small vertical adjustment of the drag mandrel 9 permits adaptation of the distance between the conical contact surface 47 and the point contact 48, depending on the production program. It was chosen to allow the angle alpha, denoted by the reference numeral 50, of the internal air lips 10 and 13, to have a value between 90° and 45° relative to the vertical axis.

Another feature of the invention is the guidance of the tube neck 44 by the conical contact surface 47 with the drag mandrel 9. This results in the stabilization of the tube neck 44 and of the tubular film 15. The tube neck 44, as well as the expansion zone 45, can no longer move up and down horizontally or vertically. An even better guidance of the tube neck 44 and of the expansion zone 45 is achieved with the embodiment shown in FIG. 3 in which a double contact with the parts internal of the tube neck 44 is present. The guidance of the tube neck 44 by the conical contact surface 47 with the drag mandrel 9 is further supported by the point contact 48 with the lower air lip 12. This results in the perfect width maintenance of the lay-flat tubing as well as the film web's absolute freedom from wrinkles.

The conical shape of the drag mandrel 9 ensures a very universal use. All HDPE, LDPE and LLDPE mixtures can be extruded as single-ply film or coextruded as two-ply or three-ply film in a very broad processing range. Depending on the geometry of the parts 9, 10 and 11 or 9, 12 and 13, positioned internally of the tube neck a very large range of widths is made available, with blow-up ratios that can lie between 1:1.75 and 1:6 and, depending on type of polymer, the range of film thickness can be adjusted between 5 and 75 micron.

Figure 4:
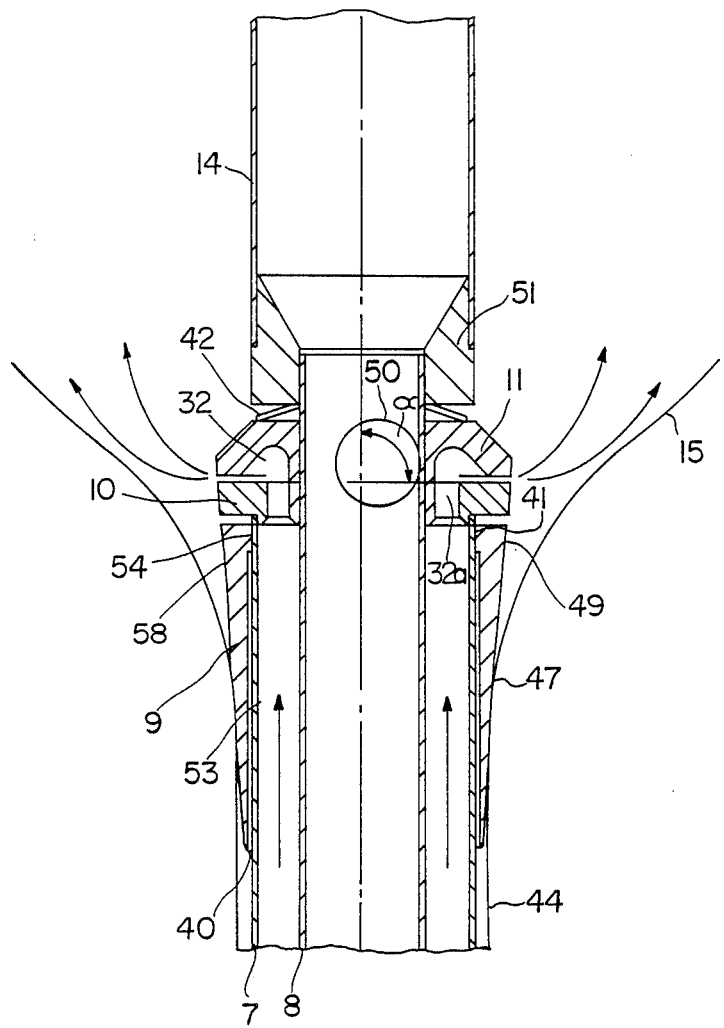
FIG. 4 shows a detail designated A in FIG. 2.

FIG. 4 shows an enlargement of the detail designated A in FIG. 2.

Here, it can be seen that the internal air lips 10 and 11 have at least one cooling channel 32, which serves for the internal cooling of the tubular film 15.

In this case, it is clearly evident that the tubular film 15 is in contact only on the conical surface 47 of the drag mandrel 9, since the outside diameters of the internal air lips 10 and 11 correspond approximately to the outside diameter of the conical drag mandrel 9.

Figure 5:
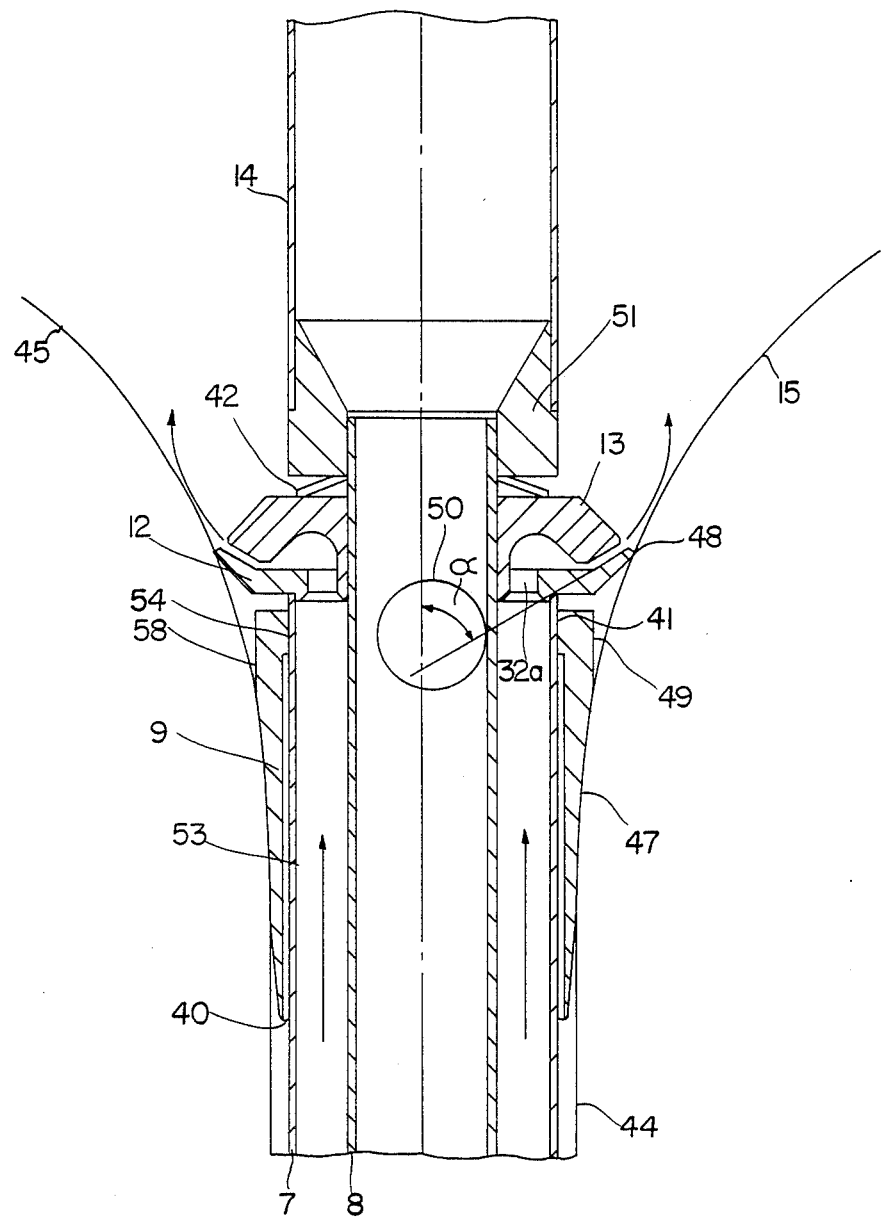
FIG. 5 shows a detail identified by B in FIG. 3.

FIG. 5 shows an enlargement of the detail designated B in FIG. 3.

In this case, internal air lips 12 and 13 are used which project beyond the outside circumference of the conical drag mandrel 9. The result is that a point contact 48 is established in addition to the conical contact surface 47.

The advantages of this embodiment have already been described hereinbefore.

As can be seen in FIGS. 4 and 5, a thermal expansion-compensation device in the form of a cup spring 42 is dispersed between the central tube 14 and the nut 51 connecting the device and the internal air lip 11 or 13.

Figure 6:
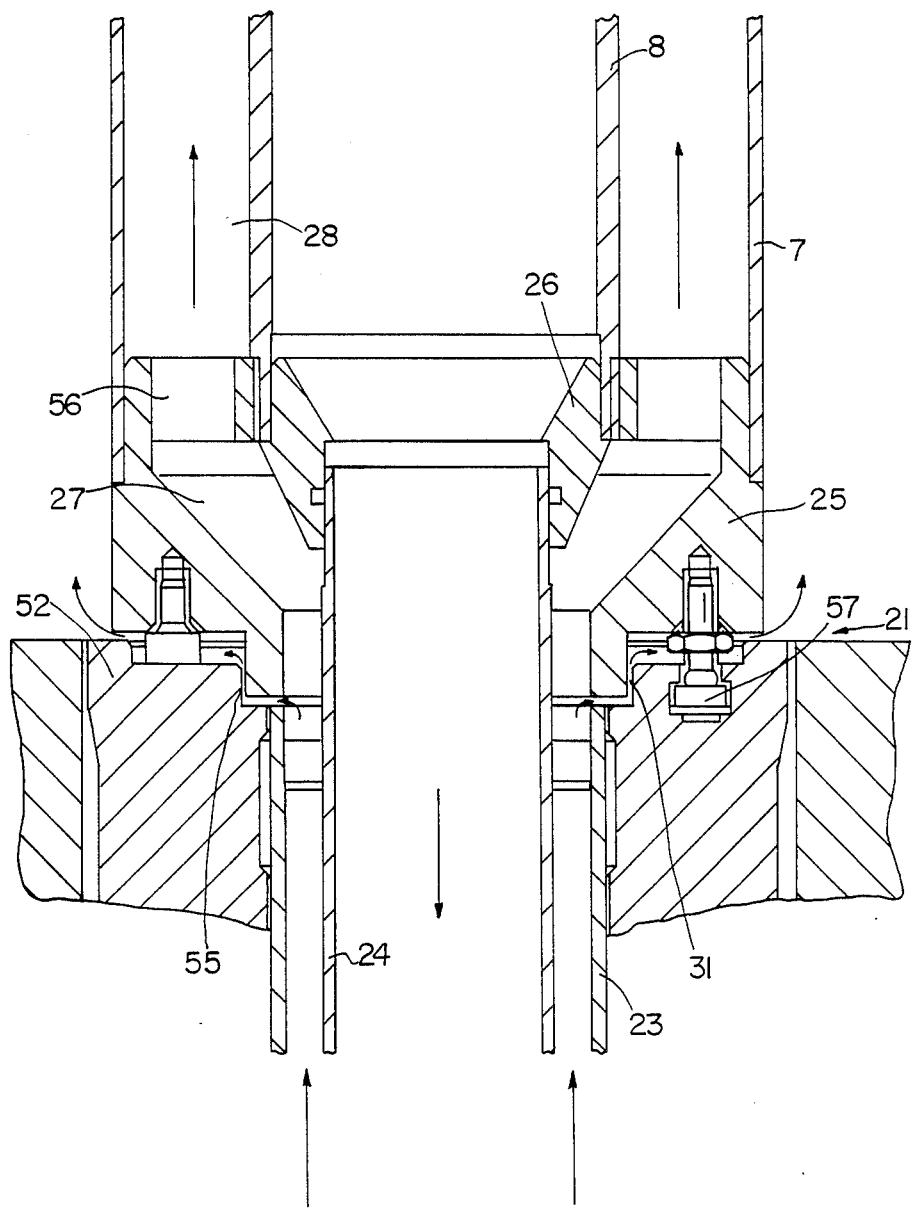
FIGS. 6 to 8 show the details with which pressure equalization between the tube neck and the first external tube, as well as between the drag mandrel and the lower air lip, is ensured.
Figure 7:
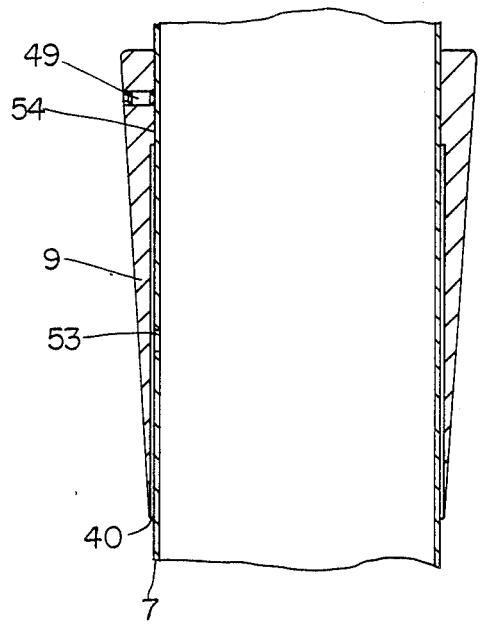
Figure 8:
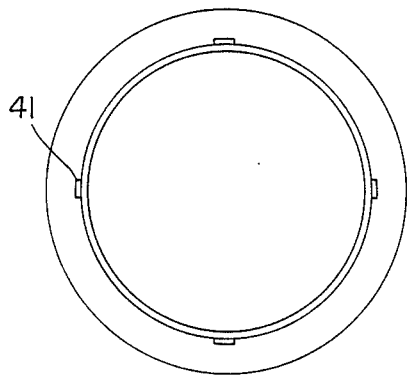

FIGS. 6 to 8 show the details with which pressure equalization between the tube neck 44 and the external tube 7, as well as between the drag mandrel 9 and the lower air lip 12, can be ensured. The pressure equalization takes place through the channels 21 of about 1 mm diameter between a main manifold 25 and a split ring 52, as well as through a 1 mm longitudinal gap 40 between the outer diameter of tube external tube 7 and the inner diameter of drag mandrel 9. Perpendicular vent bores 53 provide additional pressure equalization to the system via the gap 40. As can be seen in FIGS. 7 and 8, the gap 40 is provided over only 85% of the total height of the drag mandrel. A centering means 54 is disposed in the upper area of the drag mandrel 9. Several slots 41 are cut into the centering means 54 for the pressure equalization in the device. As apparent from the diagram in FIG. 6, the centering of the parts 25 and 52 in is effected by three support points 55, which are spaced 120° apart on the main manifold 25.

With this special construction, it is ensured that the tube neck 44 always remains very stable. Suction effects or inflations of the tube neck 44, depending on the production program, are therefore not possible. Vent gaps 31 and the gap 40, the bores 53 and the slots 41 provide further advantages during the phase of startup of the extrusion system. The air flowing out of the gaps 31 and 40 expands the tube neck 44 during the startup phases and thus makes it easier to pull the same over the drag mandrel 9 and the die air lips 10 or 12.

The air-guidance tubes 8 and 7 are centered exactly by the main manifold 25 and the lower air lips 10 or 12. The cooling air flows through bores 56 and 32a. The entire device is bolted together with the nut 51. The cup spring 42 equalizes the expansion differences which occur due to different temperatures in the tubes 8 and 7.

The entire device is attached to the split ring 52 of the die 1 with a bayonet lock 57. Therefore, rapid disassembly of the device, as is necessary whenever the split ring 52 is cleaned, is ensured.

Several provisions are necessary to prevent adhesion between the plastic melt and the drag mandrel 9 in the area of the conical contact surface 47: covering of the drag mandrel 9 by an insulating material of cotton, a possible alternative being to spray an insulating ceramic coating onto the surface of the drag mandrel 9, or reducing the contact area of the drag mandrel 9 by a coarse thread or by a wave-like profile cut onto the conical surface.

Figure 9:
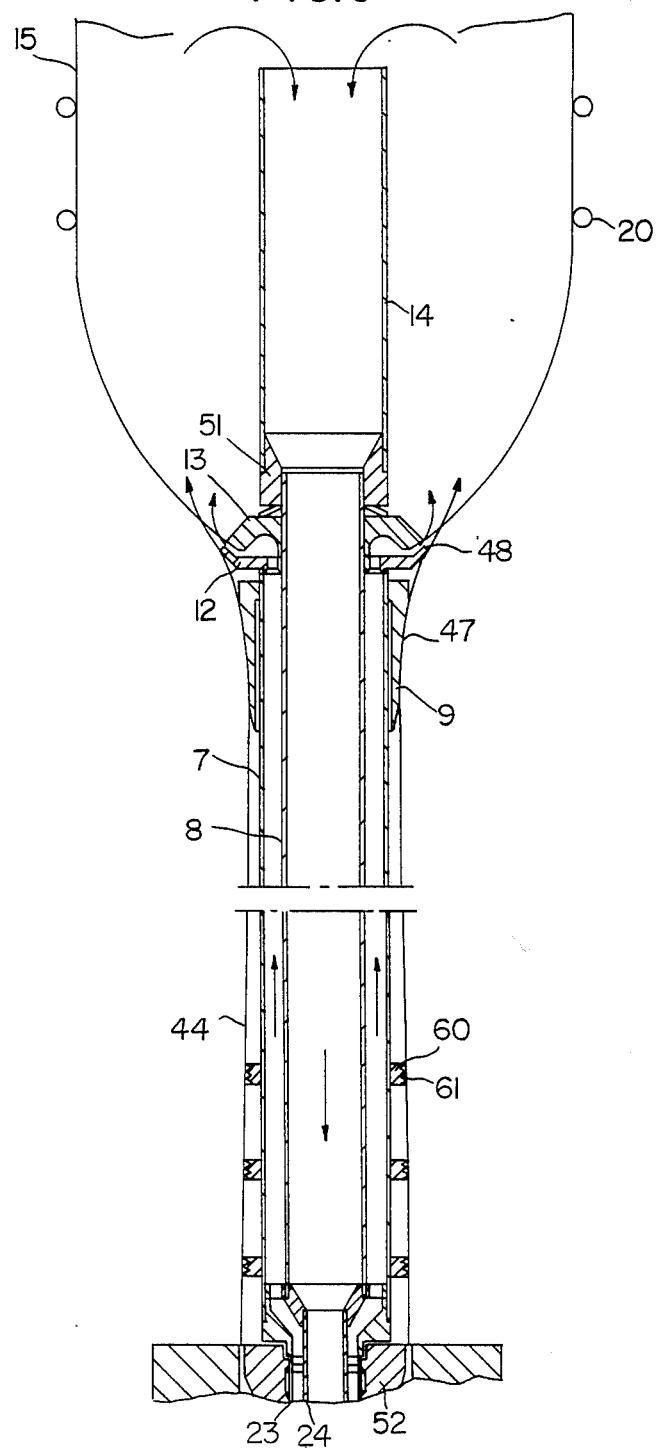
FIG. 9 shows another embodiment of the apparatus with guide rings.

An alternative version of the guidance of the tube neck 44 and of the shape of the tube 7 is illustrated in FIG. 9. A number of guide rings 60, with different diameters, which are attached to the external tube 7, ensure even better guidance of the tube neck 44 and, together with the point contact 48 and the conical contact surface 47, form a third contact surface 61. This special construction has proved effective especially when producing narrow tubular films with small die diameters and with reduced blow-up ratios. In such productions, e.g., during the production of a 500-mm-broad tubular film with a thickness approximately 12 to 18 micron from HDPE, a considerable constriction of the tube neck 44 is observed as a result of the physical polymer properties and due to the process using a long neck. The diameter of the tube neck 44 can therefore decrease to 50% of the die diameter just ahead of the expansion zone of the bubble. In order not to influence the formation of the tube neck 44 too strongly, which process is determined by the laws of physics, the geometry of the device according to FIG. 9 is fashioned as follows:

The diameter of the tube 7 is greatly reduced.

The diameter of the rings 60 is chosen to become progressively smaller moving downstream, the bottom ring is equal in size as the die and the diameter of the top ring can be reduced to 0.8 times the die diameter.

The number of rings varies according to die size and tube neck 44 height, but there is at least one ring.

The minimum diameter of the drag mandrel is also greatly reduced.

In order to reduce the surface area, the rings 60 are provided with a coarse thread 62 cut onto the outside diameter thereof.

The apparatus incorporating the invention leads to advantages which are effective in particular when increasing the system output, to an improvement of the film quality, and to a process-related improvement when adjusting and converting the film-blowing system.

A considerable increase in output is achieved when producing biaxially oriented films from HDPE, LDPE and LLDPE mixtures when employing the process with an extremely long neck of 4 to 10 times the die diameter and with very high die outputs of up to 4.5 kg/cm/hr or 25 lbs/inch/hr.

A further advantage of the device according to the invention is that a considerable quality improvement is achieved when producing biaxially oriented films from HDPE, LIPE or LLDPE mixtures with particularly good physical and mechanical properties. These improvements of the film properties are attributable to optimum longitudinal and transversal stretching of the polymeric molecular chains. Because of the additional friction on the drag mandrel, greater longitudinal stretching of the films is achieved. Because of the intensive internal cooling of the film in the expansion, a much higher internal pressure in the bubble is needed in order to perform transversal stretching of the film. Both effects lead to a considerable shortening of the expansion zone between the beginning of the expansion zone and the frost line, and also the stretching in the longitudinal and transversal direction occurs progressively much more rapidly. Thus, the optimum biaxial orientation of the film is achieved, and more uniform film strengths in both the longitudinal and transversal directions are achieved, together with very high dart-test values and optimum tear propagation strengths of the film in both directions. This is true in particular for very large widths, which are produced with relatively large dies, for which the expansion zone becomes progressively longer.

In addition, the production of biaxially oriented films from LDPE and LLDPE with particularly good optical properties and high drawdown of the polymers is possible as a result of the device incorporating the invention.

Furthermore, the present invention enables the production of biaxially oriented films with good thickness distributions. Because of the stabilization of the bubble by the drag mandrel and the special shape of the internal cooling air lips, there are no differences in thickening of the film as a result of varying internal cooling effects. In conventional internal cooling systems, horizontal displacements of the neck have negative influences on the thickness distributions.

Because of the surface contact between the tubular film and the drag mandrel according to FIG. 2, or because of the double contact between the neck, the expansion zone and the contact parts internal of the tube neck 44 according to FIG. 3, a much better bubble stability is achieved. This leads to the exact width maintenance of the lay-flat tubing and thus to the perfect freedom from wrinkles of the film. Therefore, the production of exact laps, especially with regard to the geometry of the roll and to the flatness of the film, is always ensured.

A further characteristic of the invention is the highly intensive internal cooling in the tubular film because of the short distance between the internal air lips and the expansion zone of the film. When compared to a conventional internal cooling system, the efficiency of the new device is much higher.

An important advantage of the apparatus incorporating the invention also lies in the very wide processing range of the process which can be carried out with this device. For maximum extruder output and with the same apparatus, the following conversions can be effected extremely fast and without difficulty, often under one minute:

Change of the reclining width in the range of blow-up ratios from 1 : 1.75 to 1 : 6.0.

Changes of the film thicknesses in the range from 5 to 75 micron.

Changes of the take-off speeds in the range from 15 to 200 m/min.

The final important advantage of the device incorporating the invention lies in the simple setting and conversion of the system, for which no skilled labor is needed.

We claim:

1. A highly intensive cooling process for the production of biaxially oriented films from high- and medium-molecular-weight thermoplastics using a blown-film line, including a long neck with a first end and a second, downstream end, a die at the first end of the long neck, an expansion zone at the second end of the long neck where a tube neck is formed into a bubble, and a sizing cage for guiding and controlling the diameter of the bubble to form a tubular film, comprising the steps of:

extruding plastic material through the die to form the tube neck;

externally cooling the tube neck immediately after emergence of the tube neck from the die;

internally contacting the tube neck, immediately before the expansion zone, by using a drag mandrel positioned at the second end of the long neck, to stabilize and guide the tube neck;

continuously internally cooling the bubble in the expansion zone immediately after the drag mandrel by introducing cool air immediately after the tube neck contacts the drag mandrel; and continuously removing the cool air that has been heated by the thermoplastic.

2. A highly intensive cooling process for the production of biaxially oriented films from high- and medium-molecular-weight thermoplastics using a blown-film line, including a long neck with a first end and a second, downstream end, a die at the first end of the long neck, an expansion zone at the second end of the long neck where a tube neck is formed into a bubble, and a sizing cage for guiding and controlling the diameter of the bubble to form a tubular film, comprising the steps of:

extruding plastic material through the die to form the tube neck;

externally cooling the tube neck immediately after emergence of the tube neck from the die;

internally contacting the tube neck, immediately before the expansion zone, by using a drag mandrel positioned at the second end of the long neck, to stabilize and guide the tube neck;

internally contacting the expanding tube neck on an air lip positioned immediately downstream of the drag mandrel;

continuously internally cooling the bubble in the expansion zone immediately after the tube neck contacts the air lip, by introducing cool air at the air lip; and continuously removing the cool air that has been heated by the thermoplastic.

3. A highly intensive cooling process for the production of biaxially oriented films from high- and medium-molecular-weight thermoplastics using a blown-film line, including a long neck with a first end and a second downstream end, a die at the first end of the long neck, an expansion zone at the second end of the long neck where a tube neck is formed into a bubble, and sizing cage for guiding and controlling the diameter of the bubble to form a tubular film, comprising the steps of:

extruding plastic material through the die to form the tube neck;

externally cooling the tube neck immediately after emergence of the tube neck form the die;

internally contacting the tube neck on a guide ring positioned between the first and second ends of the long neck;

internally contacting the tube neck, immediately before the expansion zone, by using a drag mandrel positioned at the second end of the long neck, to stabilize and guide the tube neck;

continuously internally cooling the bubble in the expansion zone immediately after the tube neck contacts the drag mandrel, by introducing cool air immediately after the tube neck contacts the drag mandrel; and continuously removing the cool air that has been heated by the thermoplastic.

4. A highly intensive cooling process for the production of biaxially oriented films from high- and medium-molecular-weight thermoplastics using a blown-film line, including a long neck having a first end and a second, downstream end, a die at the first end of the long neck, an expansion zone where a tube neck is formed into a bubble, and a sizing cage for guiding and controlling the diameter of the bubble to form a tubular film, comprising the steps of:

extruding plastic material through the die to form the tube neck;

externally cooling the tube neck immediately after emergence of the tube neck from the die;

internally contacting the tube neck on a guide ring positioned between the first and second ends of the long neck;

internally contacting the tube neck, immediately before the expansion zone, by using a drag mandrel positioned at the second end of the long neck, to stabilize and guide neck;

internally contacting the expanding tube neck on an air lip positioned immediately downstream of the drag mandrel;

continuously internally cooling the bubble in the expansion zone immediately after the tube neck contacts the air lip, by introducing cool air at the air lip; and continuously removing the cool air that has been heated by the thermoplastic.

5. The process as set forth in claims 1, 2, 3 or 4 further comprising the step of:

introducing the cool air by a first of two coaxial tubes extending from the die through the drag mandrel.

6. The process as set forth in claim 5, further comprising the step of:

removing the cool air that has been heated, through a central tube connected to the second of the two coaxial tubes.

7. An apparatus for highly intensive cooling of biaxially oriented films from high- and medium-molecular weight thermoplastics using a long neck on a blown film line, said long neck including a first end and a second downstream end, an expansion zone at the second end of the long neck where a tube neck is formed into a bubble, and a sizing cage for guiding and controlling the diameter of the bubble to form a tubular film, comprising:

a plastics extruder;

a die at the first end of the long neck for forming the tube neck from the extruded plastic;

means, positioned adjacent the die, for externally cooling the tube neck;

means, positioned at the second end of the long neck, immediately before the expansion zone, for internally contacting the tube neck, and stabilizing and guiding the tube neck;

means for continuously internally cooling the bubble in the expansion zone immediately after the contact means as the bubble is forming, said means introducing cool air immediately after the contact; and means for continuously removing the cool air that has been heated by the thermoplastic.

8. The apparatus as recited in claim 7, wherein the contact means comprises: a conical drag mandrel positioned at the second end of the long neck.

9. The apparatus as recited in claim 7, wherein the contact means comprises:

a conical drag mandrel positioned at the second end of the long neck, and an air lip positioned immediately downstream of and extending outwardly relative to the drag mandrel.

10. The apparatus as recited in claims 8 or 9, further comprising:
a stabilizing ring positioned between the first and second ends of the long neck, which also internally contacts the tube neck.

11. The apparatus as recited in claim 7, wherein the means for continuously providing cool air to the expansion zone includes a first tube in communication with a cool air source and mounted on the die, and
the means for continuously removing cool air that has been heated includes a second tube mounted internally and coaxially of the first tube and in communication with a hot air exhaust.

12. The apparatus as set forth in claim 11, further comprising:
a manifold connected to the die;
means for centering the second tube in the die; and
at least one cooling channel formed in the manifold, said cooling channel being formed between the second tube and the first tube in the main manifold.

13. The apparatus as set forth in claim 9, wherein the air lip includes upper and lower air lips, and at least one cooling channel is formed in the lower air lip.

14. The apparatus as set forth in claim 12, further comprising:
air channels formed between the die and the manifold for equalizing pressure between the cool air in the first tube and air between the first tube and the tube neck.

15. The apparatus as set forth in claim 9, further comprising:
a gap formed between the drag mandrel and a first tube for introducing the cool air,
slots, communicating with the gap, arranged between the drag mandrel and the first tube,
wherein said gap and said slots operate to equalize pressure between the air at a lower end of the drag mandrel and the air at an upper end of the drag mandrel.

16. The apparatus as set forth in claim 11, further comprising:
a thermal expansion-compensation means disposed between the air lip and a central tube connected to the second tube.

17. The apparatus as set forth in claim 12, wherein the manifold is attached to the die by bayonet means.

18. The apparatus as set forth in claim 8, wherein the drag mandrel is coated with an insulating cotton material.

19. The apparatus as set forth in claim 8, wherein the drag mandrel is coated with an insulating ceramic layer.

20. The apparatus as set forth in claim 8, wherein the drag mandrel has a conical surface with a thread or a wavy profile to reduce the contact surface.

21. The apparatus as set forth in claim 10, wherein the stabilizing ring has a thread for reducing the contact surface thereof.

22. The apparatus as set forth in claim 8, wherein the drag mandrel has means for vertical adjustment along the first tube.

* * * * *

UNITED STATES PATENT AND TRADEMARK OFFICE
CERTIFICATE OF CORRECTION

PATENT NO. : 4,938,903
DATED : July 3, 1990
INVENTOR(S) : Gerard Schaeffer et al.

Page 1 of 2

It is certified that error appears in the above-identified patent and that said Letters Patent is hereby corrected as shown below:

Col. 1, line 15, "HEPE" should be --HDPE--;
    line 23, "the tubular film" should be --a tube neck--;
    line 25, "transition zone from the neck to the" should be --expansion zone where the tube neck becomes a bubble and eventually a--;
    line 30, "tubular film" should be --tube neck--;
    line 31, before "neck" insert --tube--; and delete "transition" and insert --expansion--;
    line 32, before "neck" insert --tube--;
    line 36, before "neck" insert --tube--;
    line 38, before "film" insert --tubular--;
    line 55, "transition" should be --expansion--;
    line 61, before "program" insert --production--.

Col. 2, between lines 15 and 16, insert --Summary of the Invention--;
    line 23, "mold, a stabilizing" should be --die, a stabilizing drag--;
    line 25, "expanding area" should be --expansion zone--;
    line 27, "expanding area" should be --expansion zone--;
    line 32, delete "and the";
    line 33, delete "the" (1st occurrence);
    line 34, delete "the" (1st occurrence);
    line 35, delete "are always ensured";
    line 36, "is to provide" should be --provides--;
    line 39, change "startup" to --start-up--;
    line 41, "leading" should be --contacting--;
    line 42, before "neck" insert --tube--;
    line 43, before "point" insert --a--.

Col. 3, line 1, delete "air";
    line 2, "lips of the" should be --air lips--; and delete "of the".

UNITED STATES PATENT AND TRADEMARK OFFICE
CERTIFICATE OF CORRECTION

PATENT NO. : 4,938,903

DATED : July 3, 1990

INVENTOR(S) : Gerard Schaeffer et al.

It is certified that error appears in the above-identified patent and that said Letters Patent is hereby corrected as shown below:

Col. 4, line 22, "variations" should be --variation--; and "an" should be --a--;
    line 24, "blown film tubing" should be --tubular film--; and "the" should be --a--;
    line 25, "the" (1st occurrence) should be --an--;
    line 47, after "parts" insert --internal--;
    line 57, delete "tubing";
    line 67, after "1" insert a comma;
    line 68, "2 and," should be --23,--; and "7, 8," should be --7, and 8,--.

Col. 6, line 39, delete "in".

Col. 7, line 28, "as the" should be --to the--;
    line 53, "LIPE" should be --LDPE--;
    line 60, after "expansion" insert --zone--.

Col. 8, line 31, delete "laps" and insert --rolls--;
    line 36, after "the" insert --tubular--;
    line 46, delete "reclining".

Signed and Sealed this

Seventeenth Day of December, 1991

Attest:

HARRY F. MANBECK, JR.

*Attesting Officer*    *Commissioner of Patents and Trademarks*